United States Patent
Lee

(10) Patent No.: US 7,748,955 B2
(45) Date of Patent: Jul. 6, 2010

(54) VIBRATION-ISOLATING FIXING MECHANISM FOR FAN FRAME

(75) Inventor: Chin-Cheng Lee, Taipei (TW)

(73) Assignee: Inventec Corporation, Taipei (TW)

( * ) Notice: Subject to any disclaimer, the term of this patent is extended or adjusted under 35 U.S.C. 154(b) by 748 days.

(21) Appl. No.: 11/726,453

(22) Filed: Mar. 22, 2007

(65) Prior Publication Data
US 2008/0232062 A1    Sep. 25, 2008

(51) Int. Cl.
*F01D 25/04*    (2006.01)
(52) U.S. Cl. ............... 415/119; 415/213.1; 416/244 R; 416/500; 361/679.48; 361/695
(58) Field of Classification Search ........... 415/119, 415/213.1, 220; 416/244 R, 500; 411/512
See application file for complete search history.

(56) References Cited

U.S. PATENT DOCUMENTS

| | | | |
|---|---|---|---|
| 7,379,300 B1 * | 5/2008 | Chen | 361/695 |
| 7,385,814 B1 * | 6/2008 | Chen | 361/695 |
| 7,488,152 B2 * | 2/2009 | Liang | 415/119 |
| 7,545,641 B2 * | 6/2009 | Chen | 361/695 |
| 2007/0153477 A1 * | 7/2007 | Liang | 361/695 |

* cited by examiner

*Primary Examiner*—Edward Look
*Assistant Examiner*—Ryan H Ellis
(74) *Attorney, Agent, or Firm*—Peter F. Corless; Steven M. Jensen; Edwards Angell Palmer & Dodge LLP

(57) ABSTRACT

A vibration-isolating fixing mechanism for a fan frame. The mechanism, configured to couple the fan frame to first fastening portions of a casing, includes: coupling portions protrudingly disposed on two installation surfaces of the fan frame; positioning brackets each having second fastening portions and through-holes; resilient elements each circumferentially disposed between each coupling portion and each through-hole and extending to two through-hole-corresponding sides of each positioning bracket; and coupling elements coupled to the coupling portions respectively, positioned on one side of each resilient element facing away from the fan frame, and configured to position the positioning brackets and the fan frame relative to one another. Axial vibration isolation is achieved by insertion of the coupling portions into the through-holes circumferentially disposed with the resilient elements and by resilient contact between each resilient element and each coupling element.

14 Claims, 4 Drawing Sheets

VIBRATION-ISOLATING FIXING MECHANISM FOR FAN FRAME

BACKGROUND OF THE INVENTION

1. Field of the Invention

The present invention relates to fixing mechanisms, and more particularly, to a vibration-isolating fixing mechanism for a fan frame.

2. Description of the Prior Art

With CPUs becoming faster and peripheral devices becoming more numerous, computers generate heat and scale down more than they have ever before. To meet user needs, computers nowadays are equipped with built-in fans that dissipate heat by forced convection.

However, the built-in fans are sources of vibration. Resonance of a computer casing and a fan operating therein readily damages any electronic parts inside the computer casing. In this regard, a storage device, such as a hard disk, is most vulnerable, because a pick-up head (PUH) that scratches can damage disk sectors and result in data loss.

To minimize vibration, a built-in fan installed inside a computer casing is usually designed to work in the presence of a vibration isolation device comprising, according to the prior art, a pad or a resilient elements disposed between the built-in fan and the computer casing and configured to cushion any vibration spreading from the built-in fan to the computer casing. But the conventional vibration isolation device is inefficient, particularly where more than one built-in fan is installed inside the computer casing. To solve the vibration problem facing a plurality of built-in fans installed inside a computer casing, a fan frame characterized by enhanced vibration isolation is put forth. But the vibration-isolated fan frame has a drawback, that is, a vibration-isolating element has to be screwed to the fan frame, using a screw. In the event of mass production, the screw prevents space saving and miniaturization, whereas the screwing process is inconvenient and laborious.

Accordingly, an issue calling for urgent solution involves developing a vibration-isolating device dedicated to providing vibration isolation for fans, achieving ease of use, and being operated without any tool.

SUMMARY OF THE INVENTION

In light of the aforesaid drawbacks of the prior art, it is a primary objective of the present invention to disclose a vibration-isolating fixing mechanism for a fan frame such that the fan frame is readily secured in position but mitigates fan-induced vibration.

Another objective of the present invention is to disclose a vibration-isolating fixing mechanism for a fan frame such that the fan frame and a vibration-isolating element are installed without any tool.

In order to achieve the above and other objectives, the present invention discloses a vibration-isolating fixing mechanism dedicated to a fan frame and configured to couple the fan frame to first fastening portions disposed on a casing. The vibration-isolating fixing mechanism comprises: coupling portions being axle-shaped structures symmetrically protrudingly disposed on two installation surfaces of the fan frame; positioning brackets each having second fastening portions and through-holes, the second fastening portions being fastened to the first fastening portions on the casing, the through-holes being penetrated by the coupling portions; resilient elements each circumferentially disposed between each of the coupling portions and each of the through-holes, extending to two sides of each of the positioning brackets, corresponding in position to each of the through-holes; and coupling elements coupled to the coupling portions respectively, positioned on one side of the resilient elements facing away from the fan frame, configured to position the positioning brackets and the fan frame relative to one another.

As regards the vibration-isolating fixing mechanism for the fan frame of the present invention, the coupling portions symmetrically flank the fan frame and are each axially formed with a slot for insertion by each of the coupling elements and for fastening to the coupling elements by deformation. Each of the coupling elements is made of rubber, plastics, wood, or metal. In a preferred embodiment, the coupling elements are implemented as fixing pins each comprising a pin portion and an abutting portion. The fixing pins are inserted into the coupling portions to achieve an enhanced fixing function.

As regards the vibration-isolating fixing mechanism for the fan frame of the present invention, each of the pin portions of the coupling elements is outwardly and circumferentially provided with a protruding ring for fastening to the slot of each of coupling portions inserted with the respect coupling element, so as to enhance the fastening and positioning functions of the fan frame and maintain the positioning relationship between the fan frame and the positioning brackets. The abutting portions allow the vibration-isolating fixing mechanism for the fan frame of the present invention to be installed and uninstalled easily. The coupling portions are inserted to the through-holes of the positioning brackets, wherein the through-holes are circumferentially disposed with resilient elements. The abutting portions of the fixing pins are positioned on one side of each resilient element facing away from the fan frame, such that vibration originated from the fan frame is axially damped and reduced because of contact between the abutting portions of the coupling elements and the resilient elements. The coupling portions of the fan frame are penetratingly fastened to the through-holes of the positioning brackets wherein the through-holes are circumferentially disposed with the resilient elements so as to enhance axial vibration isolation and positioning. Each of the resilient elements is resilient plastics, a reed, or a spring. In a preferred embodiment, the resilient elements are plastics resilient elements so as to enhance the positioning of the coupling portions of the fan frame in the through-holes of the positioning brackets and provide vibration isolation for the fan frame, the casing, and related electronic circuits and components.

The positioning brackets are further provided with second fastening portions for fastening to the casing and securing in position the fan frame to the casing. The second fastening portions are fastened to the first fastening portions protrudingly disposed on the casing, so as to limit the displacement of the first fastening portions and enable ease of installation and uninstallation. The second fastening portions are oval holes. The first fastening portions of the casing are implemented as screws for fastening to the second fastening portions of the positioning brackets. In a preferred embodiment, the second fastening portions of a positioning bracket are implemented as oval holes for fastening to the casing, and each of the second fastening portions of another positioning bracket is defined by the inner rim of the positioning bracket and configured to fasten to a positioning element protrudingly disposed on the casing. Preferably, the through-holes of the positioning brackets are circumferentially disposed with the resilient elements and penetrated by the coupling portions of the fan frame, and the second fastening portions of the positioning brackets are fastened to the first fastening portions protrudingly disposed on the casing, for the sake of the positioning and vibration isolation of the fan frame.

Accordingly, a vibration-isolating fixing mechanism for a fan frame of the present invention comprises coupling portions flanking and protruding out of the fan frame, positioning brackets each having second fastening portions and through-holes, resilient elements each circumferentially disposed between each of the coupling portions and each of the through-holes, and coupling elements coupled to the coupling portions respectively, positioned on one side of the resilient elements facing away from the fan frame, configured to position the positioning brackets and the fan frame relative to one another, so as to provide vibration isolation and achieve ease of use.

DETAILED DESCRIPTION OF THE PREFERRED EMBODIMENTS

The following specific embodiments are provided to illustrate the present invention. Persons of skill in the art can readily gain an insight into other advantages and features of the present invention based on the contents disclosed in this specification.

Figure 1A:
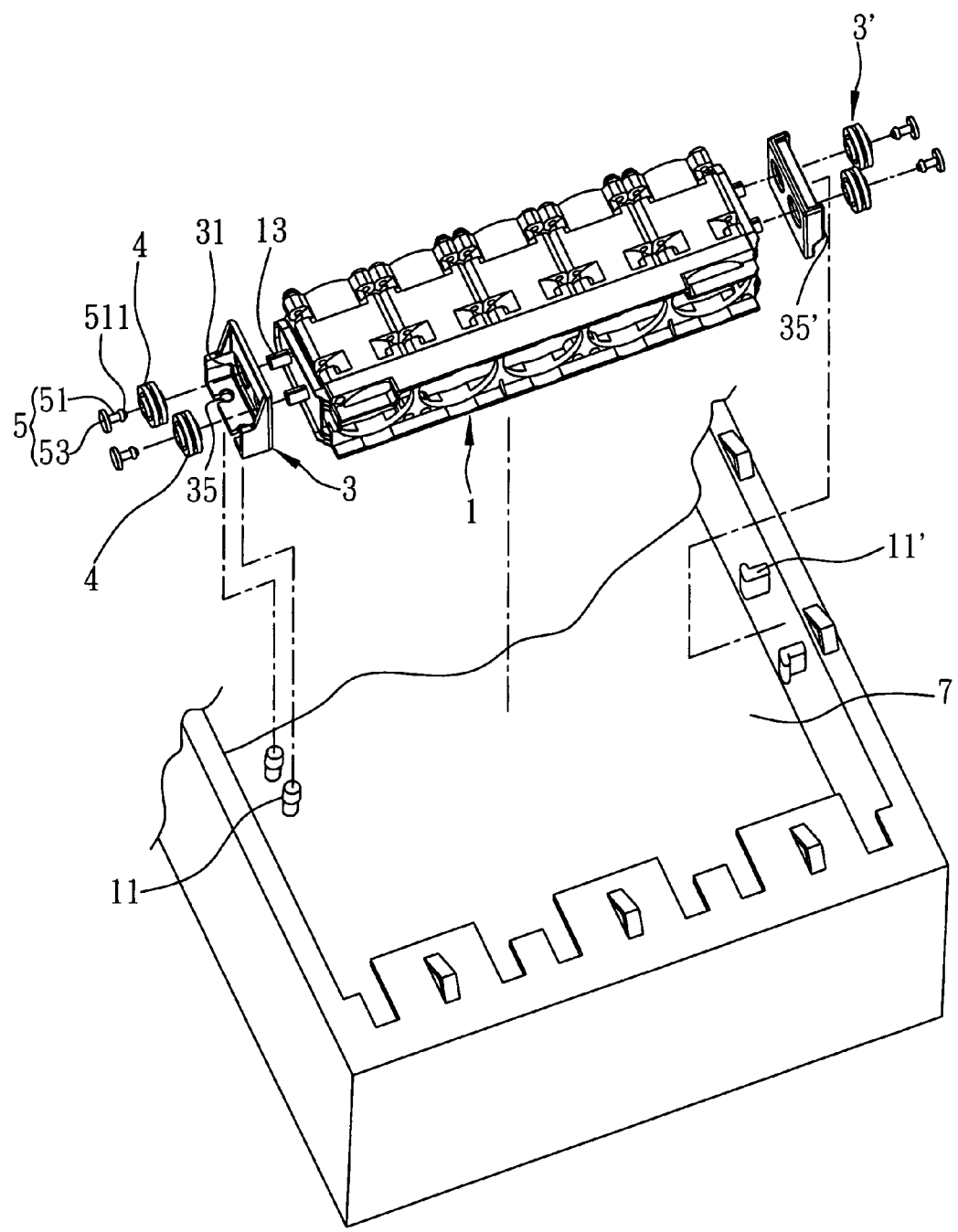
FIG. 1A is a schematic view showing how to assemble a vibration-isolating fixing mechanism for a fan frame in accordance with the present invention.

Referring to FIG. 1A, which is a schematic view showing how to assemble a vibration-isolating fixing mechanism for a fan frame in accordance with the present invention, the vibration-isolating fixing mechanism for a fan frame of the present invention is configured to couple a fan frame to first fastening portions protrudingly disposed on a casing. The vibration-isolating fixing mechanism comprises: coupling portions 13 symmetrically protrudingly disposed on two installation surfaces of the fan frame 1; positioning brackets 3 each having second fastening portions 35 and through-holes 31; resilient elements 4 each circumferentially disposed between each of the coupling portions 13 and each of the through-holes 31; and coupling elements 5 coupled to the coupling portions 13 respectively, positioned on one side of the resilient elements 4 facing away from the fan frame 1. The coupling portions 13 of the fan frame 1 are penetratingly disposed in the resilient elements 4 coupled to the positioning brackets 3 flanking the fan frame 1. Each of the resilient elements 4 is circumferentially disposed on an inner rim of each of the through-holes 31 of each of the positioning brackets 3. Fastening the second fastening portions 35 to the first fastening portions 11 protrudingly disposed on the casing 7 fastens the positioning brackets 3 to the casing 7.

This preferred embodiment teaches the following features. The positioning bracket 3 flanks the fan frame 1 and secures in position the fan frame 1 to the casing 7; the second fastening portions 35 of the positioning bracket 3 are oval holes fastenably coupled to the first fastening portions 11 protrudingly disposed on the casing 7, such that the positioning bracket 3 is disposed in and limited to a gap between the first fastening portions 11 and the casing 7, not to mention that the positioning bracket 3 installed in the aforesaid manner can be conveniently uninstalled; the first fastening portions 11 are implemented as screws screwed to the casing 7; the second fastening portions 35 are implemented as notched holes for fastening the positioning brackets 3 to a gap between the screws (that is, the first fastening portions 11) and the casing 7; each of the notched holes (that is, the second fastening portions 35) is an oval notched hole, square notched hole, or round notched hole. The other positioning bracket 3' otherwise flanks the fan frame 1 and secures in position the fan frame 1 to the casing 7. The positioning bracket 3' is a square frame for embracing the flaps so as to secure in position the fan frame 1 to the casing 7. The second fastening portions 35' of the positioning bracket 3' are defined by the inner rim of the positioning bracket 3' and fastenably coupled to the first fastening portions 11' protrudingly disposed on the casing 7, thus limiting the displacement of the positioning bracket 3', not to mention that the positioning bracket 3' installed in the aforesaid manner can be conveniently uninstalled; the first fastening portions 11' are flaps formed on the casing 7.

The coupling portions 13 of the fan frame 1 are penetratingly coupled to the coupling elements 5 and are implemented as fixing pins. The fixing pins each comprise a pin portion 51 and an abutting portion 53. The abutting portion 53 of each of the fixing pins resiliently contacts with each of the resilient elements 4 circumferentially disposed on the inner rim of each of the through-holes 31 of the positioning brackets 3 and 3', thus enhancing the vibration damping function of the fan frame 1 and securing in position the fan frame 1 better. The coupling portions 13 of the fan frame 1 are made of plastics, wood, or metal. In a preferred embodiment, the coupling portions 13 of the fan frame 1 are made of plastics so as to allow for the insertion, expansion, and grip of the coupling elements 5. However, in another preferred embodiment, the coupling portions 13 are made of metal.

Figure 1B:
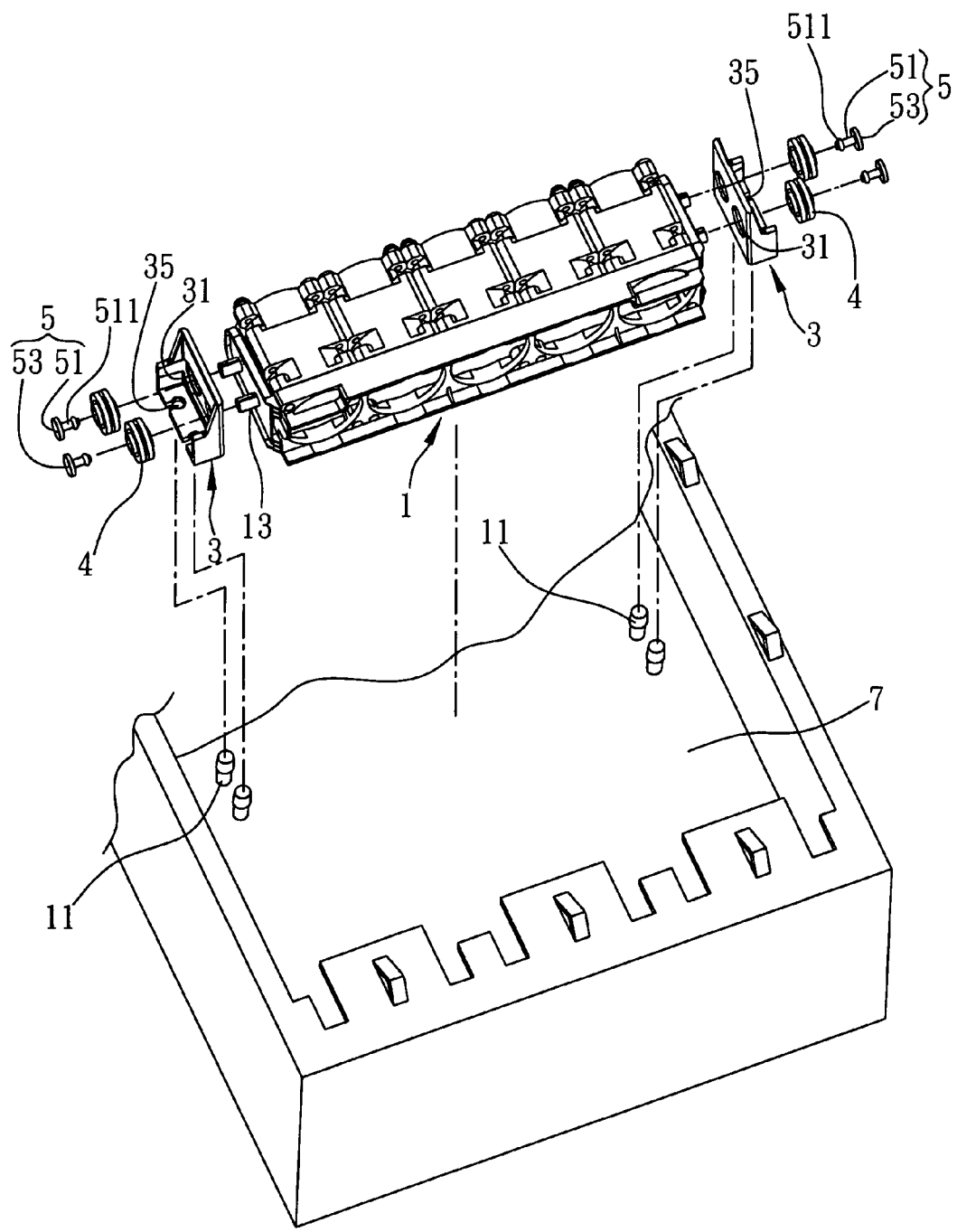
FIG. 1B is a schematic view showing the second preferred embodiment of a vibration-isolating fixing mechanism for a fan frame in accordance with the present invention.

Referring to FIG. 1B, which is a schematic view showing the second preferred embodiment of a vibration-isolating fixing mechanism for a fan frame in accordance with the present invention, the vibration-isolating fixing mechanism for a fan frame of the second preferred embodiment differs from that of the first preferred embodiment in the way as follows: the positioning brackets 3 flank the fan frame 1 symmetrically and secure in position the fan frame 1 to the casing 7; the second fastening portions 35 of the positioning brackets 3 are oval holes fastenably coupled to the first fastening portions 11 protrudingly disposed on the casing 7, such that the positioning brackets 3 are disposed in and limited to a gap between the first fastening portions 11 and the casing 7, not to mention that the positioning brackets 3 installed in the aforesaid manner can be conveniently uninstalled; the first fastening portions 11 are screws screwed to the casing 7.

Figure 2A:
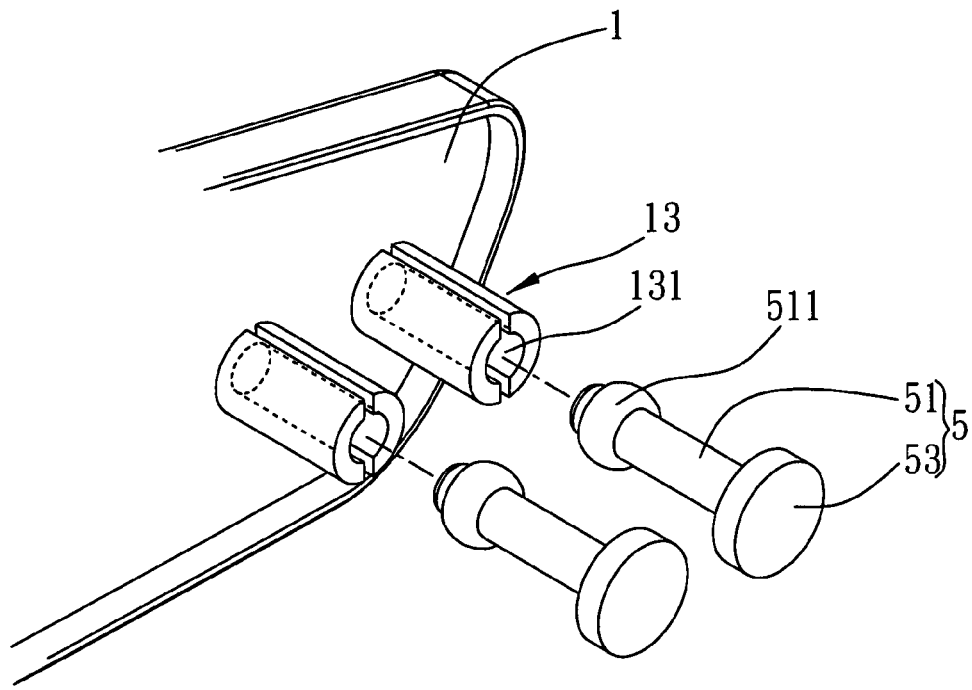
FIG. 2A is a schematic view showing how to assemble coupling elements and the fan frame of the vibration-isolating fixing mechanism for the fan frame in accordance with the present invention.
Figure 2B:
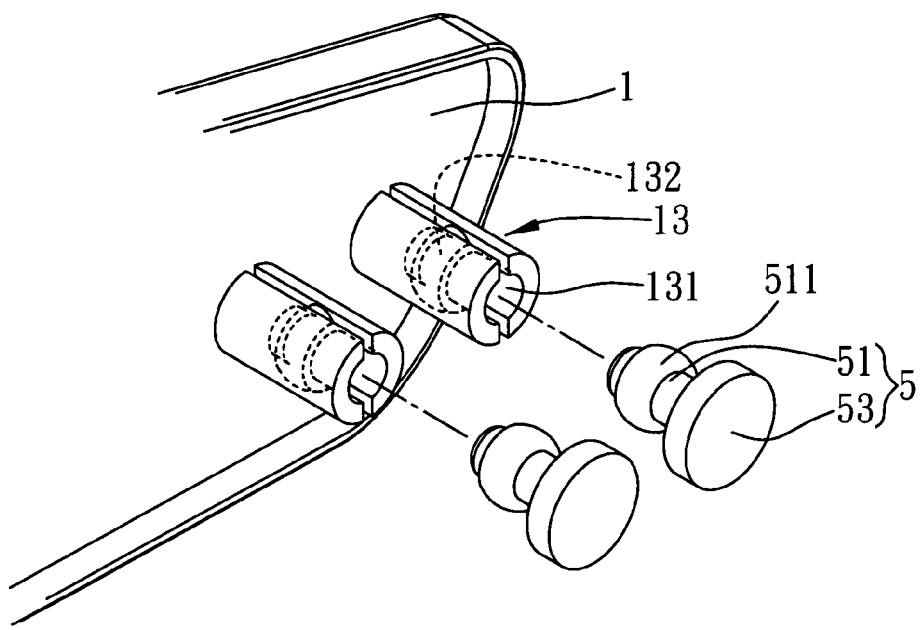
FIG. 2B is a schematic view showing how to fasten the coupling elements to coupling portions of the vibration-isolating fixing mechanism for the fan frame in accordance with the present invention.

Referring to FIG. 2A, which is a schematic view showing how to assemble coupling elements and the fan frame of the vibration-isolating fixing mechanism for the fan frame in accordance with the present invention, the coupling portions 13 of the fan frame vibration-isolating fixing mechanism of the present invention are protruding axle-shaped structures symmetrically flanking the fan frame 1 and each comprising an axially formed slot configured to deform to couple to each of the coupling elements 5 penetratingly disposed in the coupling portions 13. The coupling elements 5 are exemplified by the fixing pins. The pin portion 51 of each of the fixing pins is circumferentially formed with a protruding ring 511. The protruding ring 511 allows each of the coupling portions 13 to be firmly fastened to the fan frame 1 whenever the pin portions 51 are penetratingly inserted into the coupling portions 13 respectively. Each of the coupling portions 13 provided for the fan frame 1 is penetratingly bored such that the bore penetrating each of the coupling portions 13 corresponds in position to a first slot 131 of each of the coupling portions 13 and is penetrated by each of the fixing pins. The protruding ring 511 allows each of the fixing pins to be firmly fastened to the fan frame 1, thus enhancing the fastening and positioning functions of the fan frame 1, and maintaining the positioning relationship between the fan frame 1 and the positioning brackets 3. The abutting portions 53 of the fixing pins make an assembling process simpler. Referring to FIG. 2B, which is a schematic view showing how to fasten the coupling elements to coupling portions of another preferred embodiment of the vibration-isolating fixing mechanism for the fan frame in accordance with the present invention, each of the coupling portions 13 is axially formed with the first slot 131 for penetratingly holding each of the coupling elements 5, and each of the coupling portions 13 is radially formed with a second slot 132 for fastening to the coupling elements 5 whenever the protruding ring 511 circumferentially formed around each of the pin portions 51 of the fixing pins enters the second slot 132, thus reinforcing the bonding of the fan frame 1 and the positioning brackets 3, enhancing the function of the resilient elements 4 between the coupling elements 5 and the positioning brackets 3, and achieving the radial and axial vibration-isolating function of the fan frame 1. The fixing pins are made of rubber, plastics, wood, or metal. In this preferred embodiment the fixing pins are made of plastics to facilitate mass production, though in another preferred embodiment the fixing pins are made of rubber.

Once the pin portions 51 are inserted into the through-holes 31 circumferentially holding the resilient elements 4 and coupled to the coupling portions 13 of the fan frame 1, the abutting portions 53 will abut against and resiliently contact with the resilient elements 4, such that the coupling of the coupling elements 5 and the coupling portions 13 are characterized by vibration isolation because of the vibration-isolating characteristic of the resilient elements 4. Each of the resilient elements 4 is resilient plastic, a reed, or a spring. In this preferred embodiment, the resilient elements 4 are plastics resilient elements, such that the through-holes 31 of the positioning brackets 3 not only secure in position and provide vibration isolation for the coupling portions 13 of the fan frame 1, but also provide vibration isolation for the fan frame 1, the casing 7, and related electronic circuits and components. In another preferred embodiment, the coupling elements 5 are made of rubber.

Figure 2C:
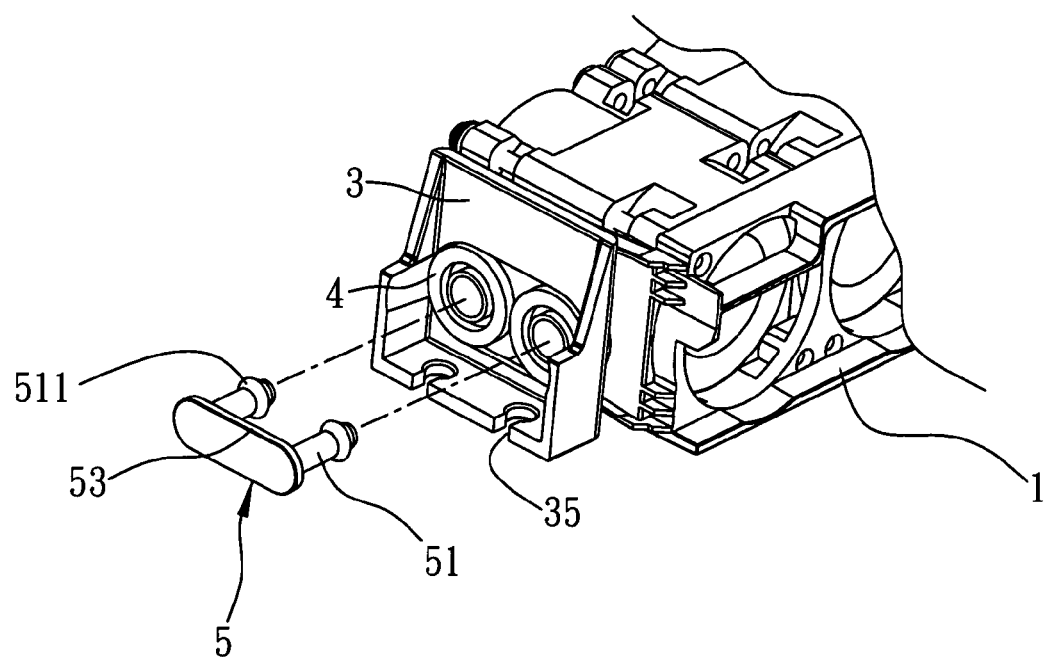
FIG. 2C is a schematic view showing another preferred embodiment of the vibration-isolating fixing mechanism for the fan frame of the present invention.

Referring to FIG. 2C, which is a schematic view showing another preferred embodiment of the vibration-isolating fixing mechanism for the fan frame of the present invention, the vibration-isolating fixing mechanism for a fan frame of this preferred embodiment differs from that of the preceding preferred embodiments in the way as follows: the coupling elements 5 of this preferred embodiment are implemented as fixing pins each having an abutting portion 53 and a plurality of pin portions 51, and the pin portions 51 are concurrently inserted into a plurality of coupling portions 13 of the fan frame 1 by a single process in a labor-saving, time-saving manner.

Accordingly, essential features of a vibration-isolating fixing mechanism for a fan frame of the present invention are as follows. Second fastening portions of positioning brackets are readily fastened to first fastening portions of a casing. Coupling portions of the fan frame are inserted into through-holes of the positioning brackets wherein the through-holes are circumferentially disposed with resilient elements. Resilient contact between the resilient elements and abutting portions of coupling elements as well as resilient contact between the coupling portions and the resilient elements together allow vibration originated from the fan frame to be isolated from the casing and related electronic circuits and components. As a result, effect of vibration originated from the fan is reduced, not to mentioned that the vibration-isolating fixing mechanism is conveniently operated without any tool.

The aforesaid embodiments merely serve as the preferred embodiments of the present invention. The aforesaid embodiments should not be construed as to limit the scope of the present invention in any way. Hence, any other changes can actually be made in the present invention. It will be apparent to those skilled in the art that all equivalent modifications or changes made to the present invention, without departing from the spirit and the technical concepts disclosed by the present invention, should fall within the scope of the appended claims.

What is claimed is:

1. A vibration-isolating fixing mechanism for a fan frame, configured to couple the fan frame to first fastening portions disposed on a casing, the vibration-isolating fixing mechanism comprising:
   coupling portions being axle-shaped structures symmetrically protrudingly disposed on two installation surfaces of the fan frame;
   positioning brackets each having second fastening portions and through-holes, the second fastening portions being fastened to the first fastening portions on the casing, the through-holes being penetrated by the coupling portions;
   resilient elements each circumferentially disposed between each of the coupling portions and each of the through-holes, extending to two sides of each of the positioning brackets, corresponding in position to each of the through-holes; and
   coupling elements coupled to the coupling portions respectively, positioned on one side of the resilient elements facing away from the fan frame, configured to position the positioning brackets and the fan frame relative to one another.

2. The vibration-isolating fixing mechanism of claim 1, wherein the coupling portions are each axially formed with a first slot for penetratingly holding each of the coupling elements by deformation of the first slot.

3. The vibration-isolating fixing mechanism of claim 1, wherein the coupling portions are each radially formed with a second slot for fastening to each of the coupling elements.

4. The vibration-isolating fixing mechanism of claim 1, wherein the coupling portions are each made of one selected from the group consisting of plastics, wood, and metal.

5. The vibration-isolating fixing mechanism of claim 1, wherein the first fastening portions are screws protrudingly disposed on the casing and fastened to the second fastening portions respectively.

6. The vibration-isolating fixing mechanism of claim 5, wherein the second fastening portions are notched holes for fastening the positioning brackets to a gap between the screws and the casing.

7. The vibration-isolating fixing mechanism of claim 6, wherein each of the notched holes is one selected from the group consisting an oval notched hole, square notched hole, and round notched hole.

8. The vibration-isolating fixing mechanism of claim 1, wherein the first fastening portions further comprise flaps laterally protrudingly provided for the casing so as to secure in position the positioning brackets.

9. The vibration-isolating fixing mechanism of claim 8, wherein the positioning brackets are square frames for embracing the flaps so as to secure in position the fan frame to the casing.

10. The vibration-isolating fixing mechanism of claim 1, wherein each of the resilient elements is one selected from the group consisting of resilient plastics, a reed, and a spring.

11. The vibration-isolating fixing mechanism of claim 1, wherein the coupling elements are each a fixing pin.

12. The vibration-isolating fixing mechanism of claim 1, wherein the coupling elements are each a fixing pin comprising a pin portion and an abutting portion.

13. The vibration-isolating fixing mechanism of claim 12, wherein the pin portion is circumferentially formed with a protruding ring, the coupling portions are each formed with a first slot for insertion by the pin portion of the fixing pin and each formed with a second slot for fastening to each of the coupling elements, so as to enhance the fastening and positioning functions of the fan frame and maintain the positioning relationship between the fan frame and the positioning brackets.

14. The vibration-isolating fixing mechanism of claim 13, wherein the fixing pin is made of one selected from the group consisting of rubber, plastics, wood, and metal.

\* \* \* \* \*